(12) United States Patent
Classon et al.

(10) Patent No.: US 7,047,006 B2
(45) Date of Patent: May 16, 2006

(54) METHOD AND APPARATUS FOR TRANSMISSION AND RECEPTION OF NARROWBAND SIGNALS WITHIN A WIDEBAND COMMUNICATION SYSTEM

(75) Inventors: Brian K. Classon, Palatine, IL (US); Kevin L. Baum, Rolling Meadows, IL (US); Philippe J. Sartori, Algonquin, IL (US)

(73) Assignee: Motorola, Inc., Schaumburg, IL (US)

( * ) Notice: Subject to any disclaimer, the term of this patent is extended or adjusted under 35 U.S.C. 154(b) by 70 days.

(21) Appl. No.: 10/833,410

(22) Filed: Apr. 28, 2004

(65) Prior Publication Data

US 2005/0245258 A1      Nov. 3, 2005

(51) Int. Cl.
*H04Q 7/20* (2006.01)

(52) U.S. Cl. .................. 455/434; 455/450; 455/452.2; 455/454; 455/515

(58) Field of Classification Search ................ 455/434, 455/452.1, 452.2, 454, 515, 127.4, 451, 513
See application file for complete search history.

(56) References Cited

U.S. PATENT DOCUMENTS

| | | | | |
|---|---|---|---|---|
| 5,590,156 | A * | 12/1996 | Carney ........................ | 375/316 |
| 5,600,707 | A * | 2/1997 | Miller, II .................... | 370/281 |
| 5,974,319 | A * | 10/1999 | Kotzin et al. ................ | 455/436 |
| 6,553,229 | B1 * | 4/2003 | Dent ........................... | 455/434 |
| 6,765,532 | B1 * | 7/2004 | Vaccaro et al. ............. | 342/417 |
| 6,807,163 | B1 * | 10/2004 | Shi ............................. | 370/337 |
| 6,836,664 | B1 * | 12/2004 | McGovern et al. ......... | 455/450 |
| 2002/0169008 | A1 * | 11/2002 | Hiben et al. ................ | 455/574 |

OTHER PUBLICATIONS

Hess, A.M. "Advanced Use of LQA Data in Improving the Quality and the Speed of ALE Link Establishment While Reducing Nounding Requirements in HF Networks" HF Radio Systems and Techniques, Conference Publication No. 474 IEEE 2000.

Johnson, E.E. "Analysis of Third-Generation HF ALE Technologies" New Mexico State University; IEEE 2000.

Pottie, G. "System Design Choices in Personal Communications" IEEE Personal Communications Oct. 1995.

"Digital Cellular Telecommunications System; Multiplexing and Multiple Access on the Radio Path" GSM 05.02 version 8.5.1 Release 1999—Section 6.2.3 pp. 24-25; Section 6.3.

* cited by examiner

*Primary Examiner*—William Trost
*Assistant Examiner*—Brandon J. Miller

(57) ABSTRACT

Narrowband remote units will scan over frequencies within a wideband channel spectrum, evaluating frequency-selective channel characteristics. The best sub-channel(s) for communication will be determined and reported back to a base station via a channel-quality report message. The base station will then utilize only a narrowband portion (e.g., one sub-channel comprised of a plurality of OFDM subcarriers) of the wideband channel for transmitting data to the narrowband unit.

20 Claims, 7 Drawing Sheets

METHOD AND APPARATUS FOR TRANSMISSION AND RECEPTION OF NARROWBAND SIGNALS WITHIN A WIDEBAND COMMUNICATION SYSTEM

FIELD OF THE INVENTION

The present invention relates generally to communication systems, and in particular, to a method and apparatus for transmission and reception of narrowband signals within a wideband communication system.

BACKGROUND OF THE INVENTION

Future communication systems are generally wideband in nature. Such communication systems will transmit and receive utilizing large bandwidths (e.g., 20–100 MHz). One of the key advantages of having large bandwidth systems is the possibility to transmit at high data rates. However, there are many challenges in building broadband remote, or mobile units, due to issues such as power consumption, signal processing complexity, size limitations, etc. Many of these issues are more easily addressed in a base station. Furthermore, different regions or markets may have different amounts of spectrum available for deploying next-generation systems. For example, an operator may have 100 MHz in one market (used to deploy a 100 MHz system), and only 20 MHz in another market, and may want to support both a 100 MHz remote unit and a 20 MHz remote unit simultaneously in the 100 MHz system. Additionally, an operator may want to enable both narrowband and wideband remote units to operate within a wideband system so that both low-cost (narrowband) and high capability (wideband) remote units can be offered to customers with the same infrastructure. Because of these issues, a need exists for a method and apparatus for transmission and reception of narrowband signals within a wideband communication system so that both narrowband and wideband units can share the same wideband spectrum.

DETAILED DESCRIPTION OF THE DRAWINGS

Figure 1:
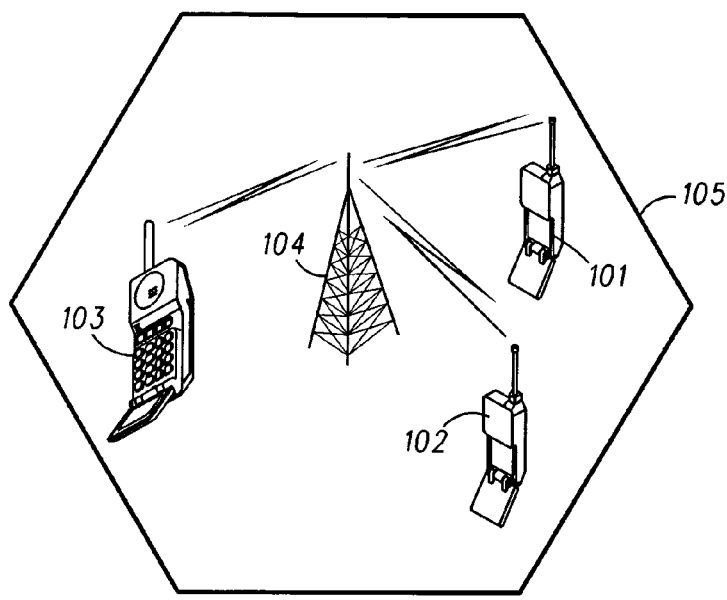
FIG. 1 is a block diagram of a communication system.

To address the above-mentioned need a method and apparatus for transmission and reception of narrowband signals within a wideband communication system is provided herein. Narrowband remote units will scan over frequencies within a wideband channel spectrum, evaluating frequency-selective channel characteristics. The best sub-channel(s) for communication will be determined and reported back to a base station via a channel-quality report message. The base station will then utilize only a narrowband portion (e.g., one sub-channel comprised of a plurality of OFDM subcarriers) of the wideband channel for transmitting data to the narrowband unit.

The present invention encompasses a method for a narrowband mobile unit to receive data in a wideband communication system. The method comprises the steps of evaluating frequency-selective channel characteristics for the wideband channel and sending a channel-quality report to a base station, wherein the channel-quality report is based on the frequency-selective channel characteristics for the wideband channel. A channel assignment is received from the base station and data is received over a portion of the wideband channel based on the frequency-selective channel characteristics, wherein a data rate for the data is based predominantly on the frequency-selective channel characteristics for the wideband channel.

The present invention additionally encompasses a method comprising the steps of receiving a channel-quality report from a narrowband remote unit, determining a portion of a wideband channel to utilize for narrowband transmissions based on the channel-quality report, determining a modulation and coding for the narrowband transmissions based on the channel-quality report, and transmitting a channel assignment to the narrowband remote unit assigning the narrowband remote unit the portion of the wideband channel. Data is transmitted to the narrowband remote unit over a narrowband channel comprising the portion of the wideband channel.

The present invention additionally encompasses an apparatus comprising channel scanning circuitry for scanning a wideband channel, logic circuitry for evaluating frequency-selective channel characteristics for the wideband channel, a transmitter for sending a channel-quality report to a base station, and a receiver receiving a channel assignment from the base station and receiving data over a portion of the wideband channel based on the channel-quality report, wherein the data rate for the data is based predominantly on the frequency-selective channel characteristics for the wideband channel.

The present invention additionally encompasses an apparatus comprising receiving circuitry receiving a channel-quality report from a narrowband remote unit, logic circuitry for determining a portion of a wideband channel to utilize for narrowband transmissions based on the channel-quality report, the logic circuitry additionally determining a modulation and coding for the narrowband transmissions based on the channel-quality report, modulation and coding circuitry for modulating and coding the data to be transmitted to the narrowband remote unit, and transmitting circuitry for transmitting data to the narrowband remote unit over the portion of the wideband channel, the data having a modulation and coding based on the channel-quality report.

Turning now to the drawings, wherein like numerals designate like components, FIG. 1 is a block diagram of communication system 100. Communication system 100 comprises a plurality of cells 105 (only one shown) each having a base transceiver station (BTS, or base station) 104 in communication with a plurality of remote, or mobile units 101–103. In the preferred embodiment of the present invention, communication system 100 utilizes a next generation Orthogonal Frequency Division Multiplexed (OFDM) or multicarrier based architecture including Adaptive Modulation and Coding (AMC). The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading, or may be based on simpler time and/or frequency division multiplexing/multiple access techniques, or a combination of these various techniques. However, in alternate embodiments communication system 100 may utilize other wideband cellular communication system protocols such as, but not limited to, TDMA or direct sequence CDMA.

Figure 2:
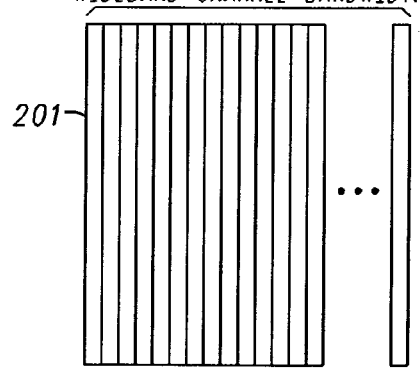
FIG. 2 illustrates the multiple carriers utilized in an OFDM communication system.

As one of ordinary skill in the art will recognize, during operation of an OFDM system, multiple subcarriers (e.g., 768 subcarriers) are utilized to transmit wideband data. This is illustrated in FIG. 2. As shown in FIG. 2 the wideband channel is divided into many narrow frequency bands (subcarriers) 201, with data being transmitted in parallel on subcarriers 201. In addition to OFDM, communication system 100 utilizes Adaptive Modulation and Coding (AMC). With AMC, the modulation and coding format of a transmitted data stream for a particular receiver is changed to predominantly match a current received signal quality (at the receiver) for the particular frame being transmitted. The modulation and coding scheme may change on a frame-by-frame basis in order to track the channel quality variations that occur in mobile communication systems. Thus, streams with high quality are typically assigned higher order modulations rates and/or higher channel coding rates with the modulation order and/or the code rate decreasing as quality decreases. For those receivers experiencing high quality, modulation schemes such as 16 QAM, 64 QAM or 256 QAM are utilized, while for those experiencing low quality, modulation schemes such as BPSK or QPSK are utilized. The selected modulation and coding may only predominantly match the current received signal quality for reasons such as channel quality measurement delay or errors, channel quality reporting delay or errors, efforts to measure or predict current and future interference, and efforts to measure or predict the future channel.

Multiple coding rates may be available for each modulation scheme to provide finer AMC granularity, to enable a closer match between the quality and the transmitted signal characteristics (e.g., R=¼, ½, and ¾ for QPSK; R=½ and R=⅔ for 16 QAM, etc.). Note that AMC can be performed in the time dimension (e.g., updating the modulation/coding every $N_t$ OFDM symbol periods) or in the frequency dimension (e.g., updating the modulation/coding every $N_{sc}$ subcarriers) or a combination of both.

Figure 3:
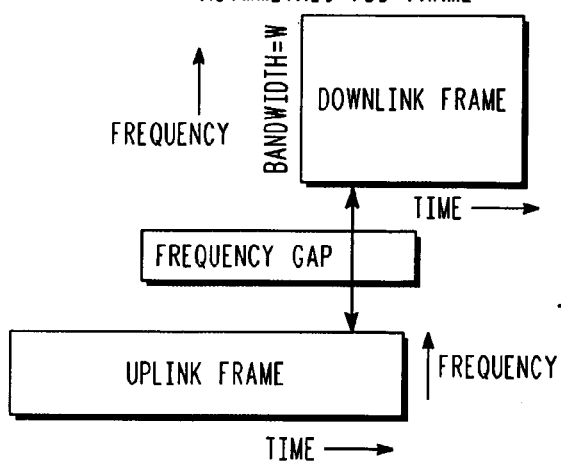
FIG. 3 illustrates an asymmetric FDD frame structure.

Consider a system that uses asymmetric frequency division duplexing (FDD), as illustrated in FIG. 3. In asymmetric FDD, the downlink and uplink bandwidths are different in order to match the expected downlink and uplink traffic characteristics, and typically have a frequency gap existing between them. For an OFDM system, the downlink frame comprises all of the available subcarriers 201 which form the wideband channel. As discussed above, there exist situations where certain remote units are incapable of utilizing the total available spectrum of the wideband channel. For example, remote unit 101 may be able to simultaneously receive all available subcarriers 201, but remote unit 102 may be able to receive only a portion of the wideband channel spectrum (e.g., a sub-channel comprising, for example 16 adjacent OFDM subcarriers 201) at any given time. These different remote unit bandwidth capabilities are illustrated in FIG. 4.

Figure 4:
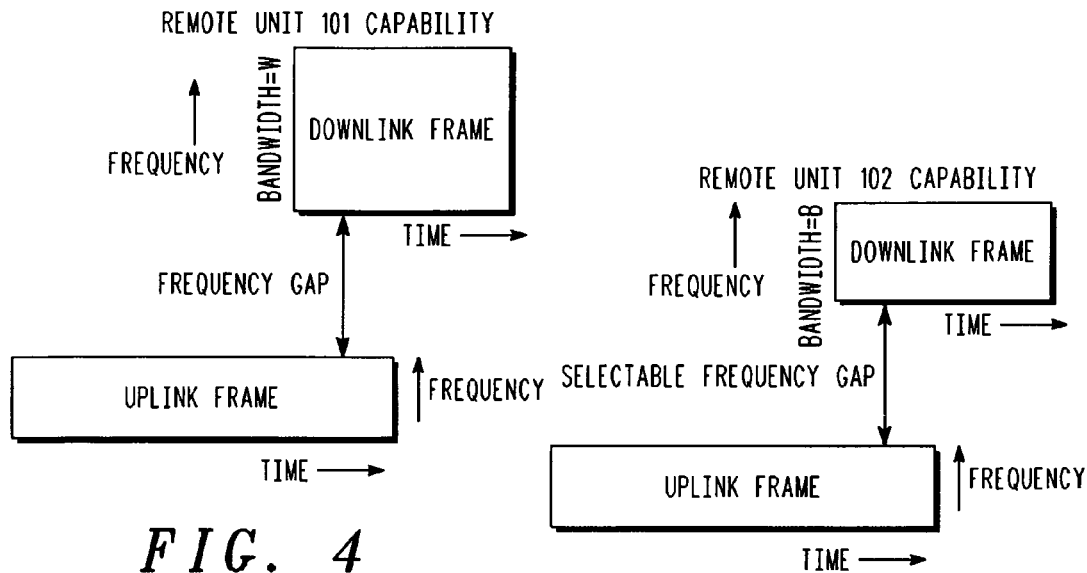
FIG. 4 illustrates two remote unit capabilities relating to the FDD frame structure of FIG. 3.

As is evident in FIG. 4, the downlink capability for remote unit 101 far exceeds that of remote unit 102. As discussed, an operator may want to enable both narrowband and wideband remote units to operate within a wideband system so that both low-cost (narrowband) and high capability (wideband) remote units can be offered to customers with the same infrastructure. In order to address this issue, narrowband remote units will scan over frequencies within the wideband channel spectrum, evaluating frequency-selective channel characteristics. The best sub-channel(s) for communication will be determined and reported back to base station 104 via a channel-quality report message. Base station 104 will then utilize only a narrowband portion (e.g., one sub-channel comprised of a plurality of OFDM subcarriers) of the wideband channel for transmitting data to the narrowband unit.

In a first embodiment of the present invention the narrowband remote unit will send to base station 104 a list of preferred sub-channels based on the channel characteristics of the scanned sub-channels. Depending on the particular system implementation and overhead constraints, the length of the list may vary. For example, the list may contain only the single best sub-channel index, or a quality-ordered list of the best N sub-channels. Alternatively, the narrowband unit may send back a list of the sub-channels that should be avoided, due to poor quality. Base station 104 then chooses an appropriate sub-channel for transmitting data to the narrowband remote unit. In this case, the data rate could be a function (such as twice) of the data rate the poor channel could support. If a preferred channel and a channel to avoid are sent back, and a channel other than the preferred channel is used for data transmission, the data rate could be a function (e.g., 75% of the data rate supported by the preferred channel). However, in an alternate embodiment of the present invention, base station 104 is simply provided with the channel characteristics evaluated by the narrowband remote unit. Base station 104 will then determine the best sub-channel to utilize for narrowband transmission. Regardless of which technique is utilized to determine the sub-channel for narrowband transmission, base station 104 will provide the narrowband remote unit a message indicating the sub-channel to be utilized, and narrowband data transmission takes place utilizing that sub-channel. The message is typically contained in an explicit control/signaling/assignment (C/S/A) message field, but all or part of the message may be implicitly communicated in conjunction with the narrowband transmission. For example, the message could comprise a remote unit specific cyclic redundancy check (CRC) code that protects a data transmission.

Figure 5:
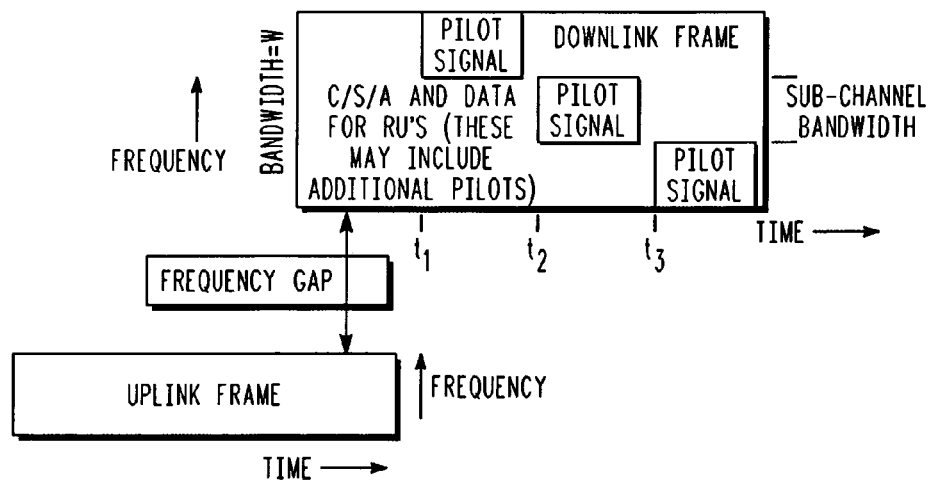
FIG. 5 illustrates a pilot transmission format supporting scanning.

As discussed above, when determining the sub-channel for narrowband communication, the spectrum within the wideband channel is scanned to determine quality information for particular sub-channels within the wideband channel. FIG. 5 illustrates one embodiment of a scanning procedure. As shown in FIG. 5, on each sub-channel bandwidth, pilot signals are provided at various times in order to perform the channel measurement operations. The pilot signals are offset in time so that a narrowband remote unit can sequentially scan all the sub-channel pilots. Thus, the scanning procedure comprises receiving a plurality of pilot channels on various sub-channels, and analyzing the quality of the pilot channels. Thus, at a first time period, a remote unit will scan and receive a first pilot channel on a first subcarrier, while at a second time period, the remote unit will scan and receive a second pilot channel on a second subcarrier. This procedure continues until all pilot channels on all subcarriers are received and scanned for quality information. Note that the scanning can be performed over the entire wideband channel as describe above, or only a portion of the wideband channel, in order to reduce the scanning burden on the remote unit.

Figure 6:
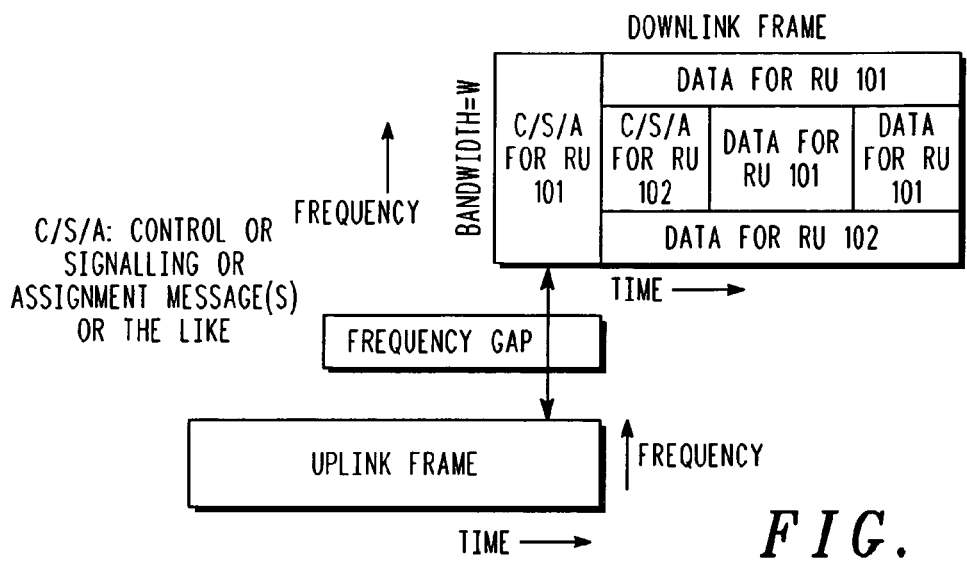
FIG. 6 illustrates transmissions to a narrowband remote unit and a wideband remote unit in a frame.
Figure 7:
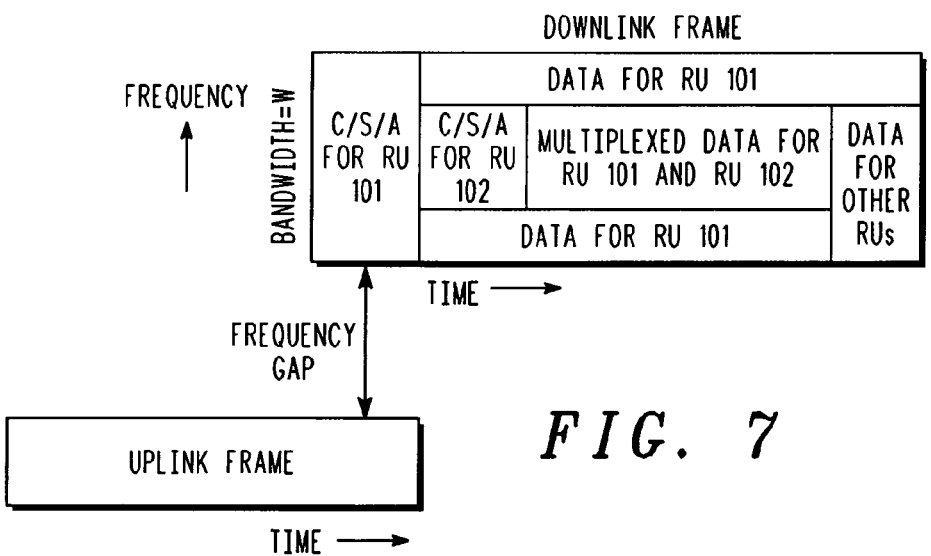
FIG. 7 illustrates transmissions to a narrowband remote unit and a wideband remote unit in a frame.

In one embodiment of the present invention, the pilot signals for scanning are embedded within data transmitted to the remote units. The data transmission scheme is illustrated in FIG. 6 and FIG. 7. Although not shown, the pilots for scanning may be included within the data for remote unit 102 or the data for remote unit 101 or in the multiplexed data for both remote units 101 and 102. The pilots for scanning may also be pilots normally used for data reception which are used for scanning when the unit is not actively receiving data. The pilots can either occupy the whole frequency range or be specific for a given sub-channel. They can be signals solely used for the purpose of selecting a sub-channel or can serve other purpose as well, such as, e.g., assisting in the wideband channel estimation process. Based on the pilot signal, the narrowband remote units determine channel quality information in a sub-channel. In a first embodiment of the present invention the channel quality information comprises a measurement of the frequency response of the channel on a sub-channel. More particularly, the quality information can be the received signal strength indicator (RSSI) averaged over the sub-channel, the received signal strength indicator (RSSI) of the pilot averaged over the sub-channel, the received carrier over noise (C/N) ratio averaged over the sub-channel, the received carrier over interference (C/I) averaged over the sub-channel or the received carrier over noise plus interference (C/(I+N)) averaged over the sub-channel. In this case, the quality metrics consist of at least a single value for the sub-channel. The measurement/estimation may be performed for some and preferably all sub-channels. In this case, the channel metrics consists of a set of several values. The scanning may be one additional sub-channel per frame other than the sub-channel the remote unit is actively receiving data on.

Figure 8:
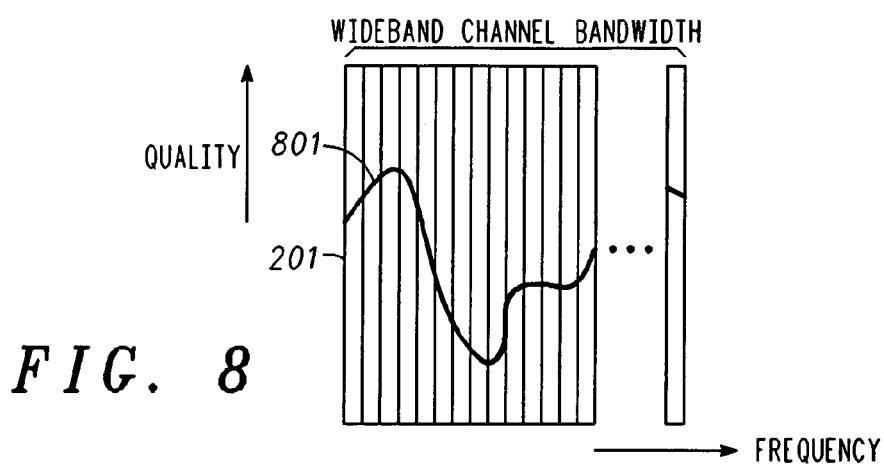
FIG. 8 illustrates channel quality as a function of frequency.

FIG. 8 illustrates how the quality of the signal can change based on frequency. More particularly, FIG. 8 shows how quality 801 of a signal may vary over frequency, or the channel bandwidth. As is evident, quality 801 is relatively high for the first four subcarriers, and relatively low for $7^{th}$ through $9^{th}$ subcarriers. With this type of information available to a narrowband remote unit based on scanning within the wideband channel, the remote unit can either determine the best sub-channel for narrowband transmission, or may simply provide sub-channel quality information for one or more sub-channels to base station 104, letting base station 104 determine the best sub-channel for narrowband transmission.

If quality information can be measured and reported on a frame-by-frame basis, then AMC can be performed on a frame-by-frame basis as well, with the particular modulation/coding utilized being based on the channel quality of the particular sub-channel. More particularly, base station 104 will determine the modulation/coding scheme utilized for a particular sub-channel based on its particular channel quality. In general, the channel quality information is valid only for a time on the order of the channel coherence time so that the determination of the modulation/coding scheme needs to be performed with a fine time granularity. The coherence time of the channel is related to the remote unit speed; channel quality information gets more outdated the faster the remote unit is moving, or the faster the environment surrounding the remote unit changes. This time granularity is typically every frame or once every few (two or three) frames if a single time granularity is selected for all remote units based on a largest speed of a reasonable range of speed. The time granularity may be longer for a remote unit that is moving slower than other remote units. If quality information is available for multiple subcarriers within the sub-channel, then AMC can optionally be applied in the frequency dimension as well (e.g., over the subcarriers within the sub-channel).

Figure 9:
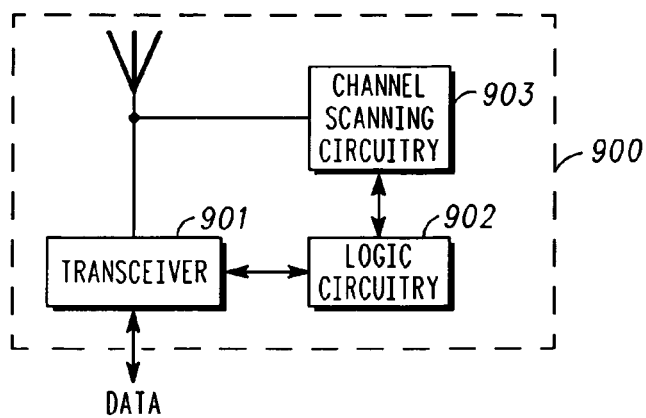
FIG. 9 is a block diagram of a narrowband remote unit.

FIG. 9 is a block diagram of narrowband remote unit 900. As shown, unit 900 comprises channel transceiver 901, logic circuitry 902, and channel scanning circuitry 903, transceiver 901 serves as both a transmitter for sending a channel-quality report to a base station, where the channel-quality report is based on the frequency-selective channel characteristics for the wideband channel, and a receiver receiving a channel assignment from the base station and receiving data over a portion of the wideband channel based on the channel-quality report. Channel scanning circuitry 903 serves as means for scanning within a wideband channel bandwidth to determine the best sub-channel for narrowband transmission/reception. More particularly, during operation, logic circuitry 902 directs channel scanning circuitry 903 to periodically scan within the wideband channel spectrum to determine a channel quality metric for various frequency bands or sub-channels within the wideband channel frequency range. The channel quality is reported back to logic circuitry 902. Circuitry 902 serves as means for preparing a channel-quality report. As discussed above, this report may simply comprise a list of preferred sub-channels based on the frequency-selective channel characteristics, or in the alternative may comprise a list of sub-channels along with their perceived quality, or quality information, or a list of subcarriers along with their perceived quality. This list is passed to transceiver 901 where it is transmitted to base station 104. In response, transceiver 901 receives a message from base station 104, indicating the sub-channel utilized for narrowband communication with remote unit 900. Data is then transmitted to remote unit 900 utilizing a subset consisting of a group of subcarriers of the spectrum in the wideband channel (e.g., a sub-channel). The data is received and output by transceiver 901. Note that this scanning process should be performed with a fine time granularity (e.g., every frame or every other frame, or related to the coherence time of the remote unit).

Figure 10:
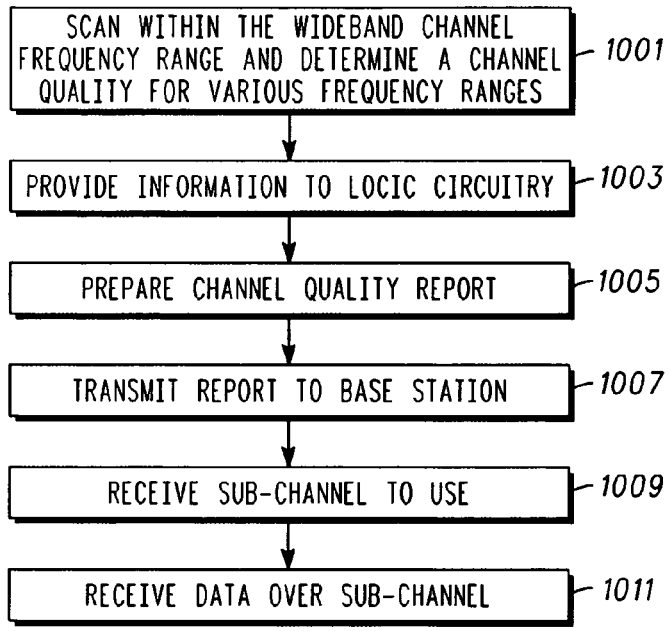
FIG. 10 is a flow chart showing operation of the narrowband remote unit of FIG. 9.

FIG. 10 is a flow chart showing the operation of narrowband remote unit 900. The logic flow begins at step 1001 where channel scanning circuitry 903 scans within the wideband channel frequency range and determines a channel quality for various frequency ranges (e.g., sub-channels) within the wideband frequency range. As discussed above, this scanning procedure preferably takes place on a frame-by-frame basis. In other words, the wideband channel is preferably scanned during each frame. At step 1003, this information is provided to logic circuitry 902, and is utilized to prepare a channel-quality report message (step 1005), which is transmitted to base station 104 (step 1007). At step 1009, a channel-assignment message is received from base station 104 indicating the sub-channel to be utilized for data transmission, and at step 1011, data is received over the sub-channel. As discussed above, the sub-channel comprises a narrowband channel that occupies a portion of the wideband channel. As shown in FIG. 6 and FIG. 7, the channel-assignment message can be received over the same portion of the wideband channel utilized for narrowband transmissions. Alternatively, the channel-assignment message can be received over a different portion of the wideband channel. Finally, it should be noted that the modulation and coding rate (and hence the data rate) is based on the channel-quality report, and in the preferred embodiment of the present invention changes on a frame-by-frame basis.

Figure 11:
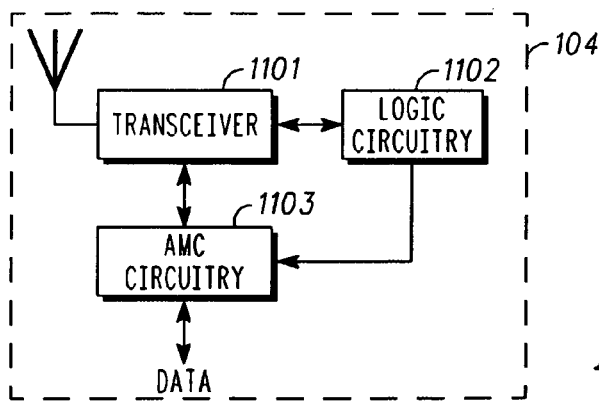
FIG. 11 is a block diagram of a base station.

FIG. 11 is a block diagram of base station 104. As shown, base station 104 comprises transceiver 1101, logic circuitry 1102, and AMC circuitry 1103. During operation transceiver 1101 (acting as a receiver) receives a channel-quality report from a narrowband remote unit and passes the report to logic circuitry 1102. Logic circuitry 1102 serves as means for determining a sub-channel to utilize from those available to the wideband system. As discussed above, this may be accomplished by simply choosing a sub-channel already provided within the channel-quality report, or alternatively, this may be accomplished by analyzing the channel-quality report to determine a sub-channel having a best quality. Finally, AMC circuitry 1103 serves as means for modulating data transmitted to the narrowband remote unit. In the preferred embodiment of the present invention this sub-channel assignment process is performed with a fine time granularity (e.g., every frame or every other frame), however, in alternate embodiments of the present invention the sub-channel assignment process can be performed over varying time periods. Transceiver 1101, acting as a transmitter, transmits data to the narrowband remote unit over a portion of the wideband channel, the data having a modulation and coding based on the channel-quality report.

Figures 12, 13:
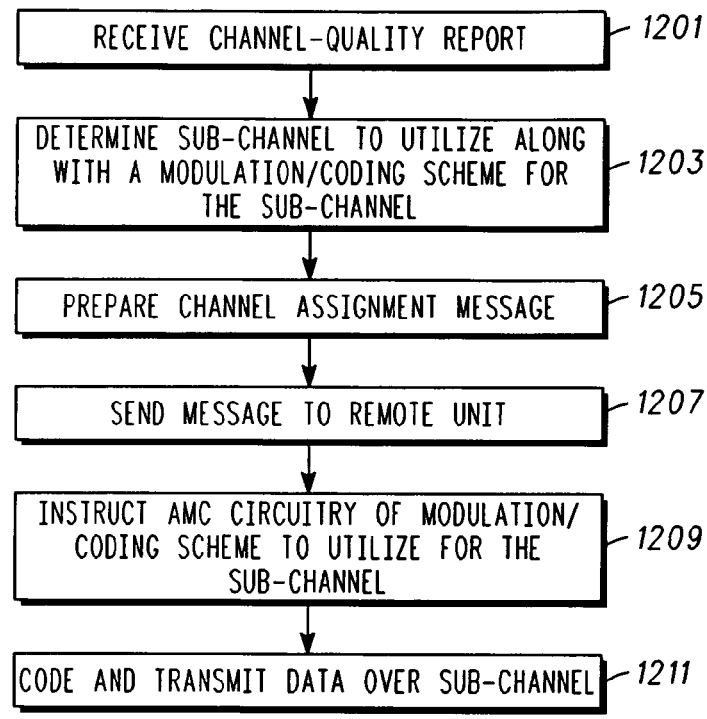
FIG. 12 is a flow chart showing operation of the base station of FIG. 11.
FIG. 13 illustrates multiplexing within a sub-channel.

FIG. 12 is a flow chart showing operation of base station 104. The logic flow begins at step 1201 where a channel-quality report is received by transceiver 1101 and passed to logic circuitry 1102. At step 1203 logic circuitry 1102 determines a sub-channel to utilize for narrowband transmission, along with a modulation/coding scheme for the sub-channel. The base station 104 may decide to not transmit to the remote unit, or to transmit to the remote unit in a future frame. At step 1205, logic circuitry 1102 prepares a channel-assignment message to transmit to remote unit 900, and at step 1207 the message is transmitted to remote unit 900. At step 1209, logic circuitry 1102 instructs AMC circuitry to utilize a particular data rate (i.e., modulation/coding scheme) for the sub-channel utilized for narrowband transmission, and at step 1211 the data is properly coded and transmitted over the narrowband sub-channel. As discussed above, a subset of the frequency band is utilized, and is modulated/coded based on the perceived quality of the channel reported to base station 104 as part of the channel-quality report. Because the modulation/coding is directly related to the data transmission rate, the particular data rate is predominantly based on the frequency-selective channel characteristics reported by the remote unit in its channel-quality report.

The above-described procedure for transmitting to both wideband and narrowband units also allows the ability to transmit to both a narrowband remote unit and a wideband remote unit within the same time interval, within the same downlink frame. This is illustrated with reference to FIG. 6 which shows transmissions to wideband remote unit 101 and narrowband remote unit 102 within the same frame. In this example, the data transmission to remote unit 102 is on a particular sub-channel (frequency range) within the wideband channel, and data transmission to remote unit 101 occurs in the remainder of the wideband channel. Also, the data transmission to remote unit 102 ends before the end of the frame, allowing time for remote unit 102 to perform scanning. Additionally, the assignment message for remote unit 102 is contained in a control/signaling/assignment message (C/S/A) field for remote unit 102, which in this example is transmitted on the same sub-channel as the data for remote unit 102.

FIG. 7 also shows transmissions to wideband remote unit 101 and narrowband remote unit 102 within the same frame. In this example, the data transmission to remote unit 102 is on a particular sub-channel within the wideband channel, and data transmission to remote unit 101 occurs over the entire wideband channel, including the sub-channel used for data transmission to remote unit 102. In this case, the sub-channel for remote unit 102 is shared with the transmissions to remote unit 101 by a predetermined multiplexing scheme. Data transmissions to two or more narrowband remote units (not shown) may also occur on the same sub-channel by sharing the sub-channel according to a predetermined multiplexing scheme. Although not shown in FIG. 7, the C/S/A field for remote unit 102 could also be shared with the C/S/A field for remote unit 101 (or other remote units in the system) by a predetermined multiplexing scheme.

Figure 14:
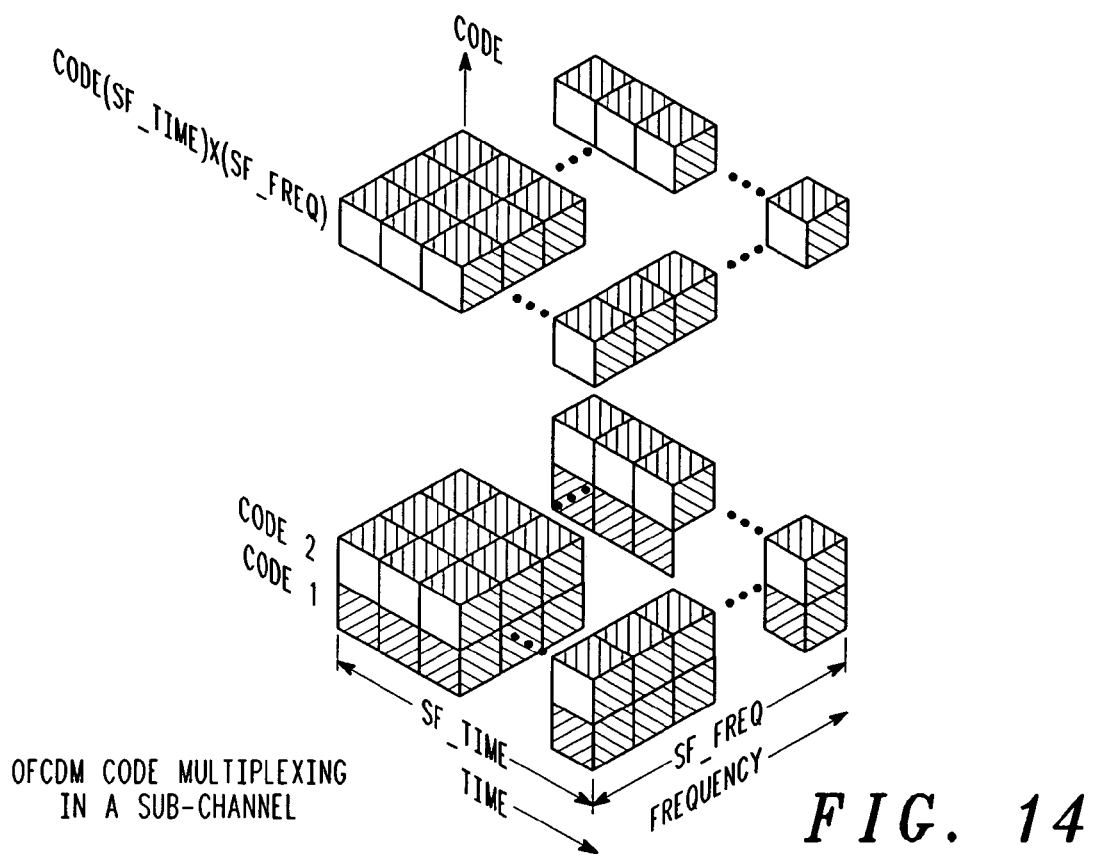
FIG. 14 illustrates code multiplexing within a sub-channel.
Figure 15:
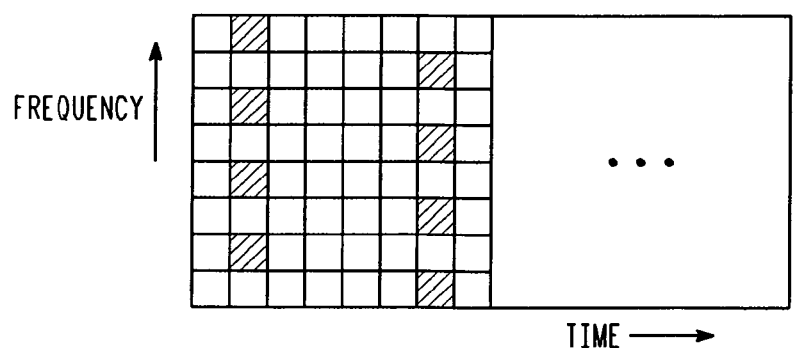
FIG. 15 illustrates a sub-channel structure.

FIG. 13 and FIG. 14 show multiplexing schemes for an example sub-channel structure shown in FIG. 15. In FIG. 15, each row represents a single subcarrier of an OFDM signal, each column represents an OFDM symbol period, and the sub-channel comprises a block of eight adjacent subcarriers within the wideband channel. As illustrated, a sub-channel may include both data symbols and pilot symbols to support channel estimation and coherent detection. FIG. 13 illustrates time multiplexing, frequency multiplexing, and time-frequency multiplexing data for remote unit 101, remote unit 102, and remote unit 103 within a single sub-channel.

FIG. 14 illustrates code multiplexing within a sub-channel for a system based on OFDM with spreading and code multiplexing (OFCDM). In this example, the spreading factor in the frequency (subcarrier) dimension is SF_freq, and the spreading factor in the time dimension (OFDM symbol periods) is SF_time, where SF_freq is preferably less than or equal to the number of subcarriers in the sub-channel. Code 1 is used as a pilot and the remaining codes may be divided among one or more remote units.

Figure 16:
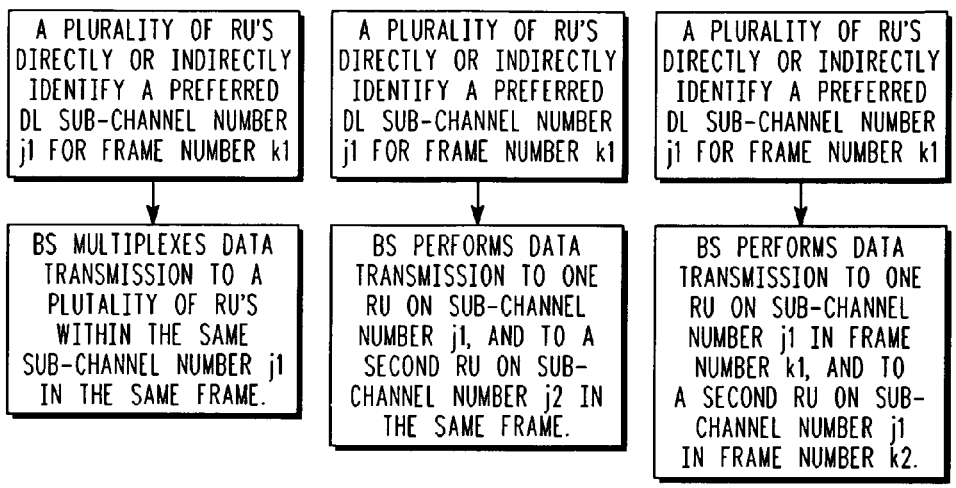
FIG. 16 is a flow- chart showing example sub-channel contention resolution.

When the system has multiple active narrowband remote units, there is a possibility that two or more narrowband remote units will request the same sub-channel. This is referred to as sub-channel contention. In the sub-channel contention resolution, the base station (BS) arbitrates which remote unit/remote units will be assigned a particular sub-channel. The arbitration method may be based on various factors such as the channel-quality reports, or quality of service constraints, or fairness criteria. FIG. 16 shows various flow charts illustrating sub-channel contention resolution for the downlink (DL).

In each example, multiple remote unit's directly (e.g., based on a preferred sub-channel index from the remote units) or indirectly (e.g., based on analysis by the base station of frequency-selective channel characteristics of the remote units) identify the same preferred sub-channel number j1 for the same frame number k1. In a first embodiment, the base station multiplexes data transmissions to a plurality of remote unit's within the same sub-channel #j1 in the same frame. In a second embodiment, the BS performs data transmission to one remote unit on sub-channel #j1, and to a second remote unit on sub-channel #j2 in the same frame. In a third embodiment, the BS performs data transmission to one remote unit on sub-channel #j1 in frame #k1, and to a second remote unit on sub-channel #j1 in frame #k2. Thus, in the third embodiment, transmissions to the narrowband remote units take place on differing frames of the narrowband channel.

Figure 17:
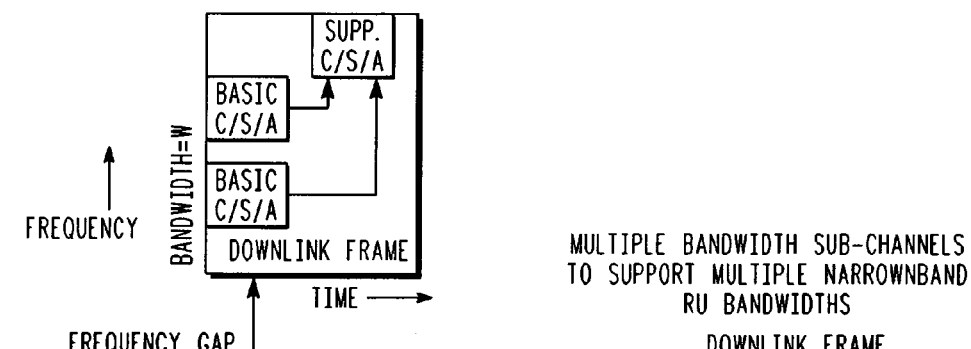
FIG. 17 illustrates transmission of control/signaling/assignment (C/S/A) messages in a frame.

As indicated earlier, a sub-channel assignment message for a remote unit may be transmitted in a C/S/A field. In a first embodiment, the C/S/A field for a remote unit is transmitted on a fixed or well known sub-channel. This enables a narrowband remote unit to know which sub-channel to tune its receiver to within the wideband channel to detect its C/S/A. The C/S/A may then direct the remote unit to a different sub-channel for its data assignment. As an enhancement to this method, the C/S/A information for a remote unit may be transmitted on multiple well-known sub-channels so that a remote unit can tune to the C/S/A sub-channel that has the highest quality (e.g., based on scanning in a previous frame). In an alternate embodiment, a C/S/A for a future frame may be embedded in the data transmission to a remote unit in the current frame. In another alternate embodiment, the C/S/A may be divided into two segments, as shown in FIG. 17. The first segment, referred to as a basic C/S/A, is transmitted on a well known sub-channel (or optionally repeated on multiple well-known sub-channels as described above and as shown in FIG. 17). The first segment may contain basic broadcast information, a number of assignment messages for remote units, and pointers to the locations of second segment C/S/As for some remote units. The second segment C/S/A for a remote unit, referred to as a supplemental C/S/A, contains a specific assignment message for the remote unit. In another alternate embodiment, the C/S/A for a particular remote unit is transmitted on the same sub-channel as the sub-channel assignment contained within the assignment message. This enables a remote unit to tune to its preferred sub-channel and it will then be able to receive the C/S/A and data on the same sub-channel. If the base station chooses not to assign the preferred sub-channel, then the remote unit will not detect an assignment in the current frame.

Figure 18:
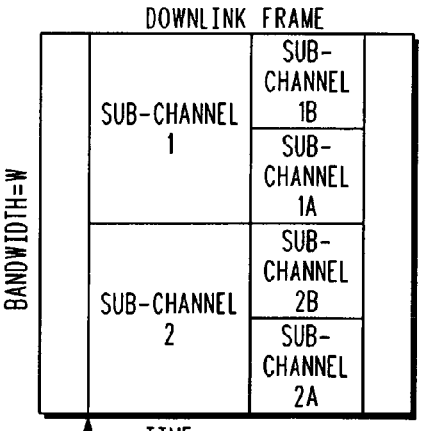
FIG. 18 illustrates multiple sub-channel bandwidths in a frame.
Figure 18:
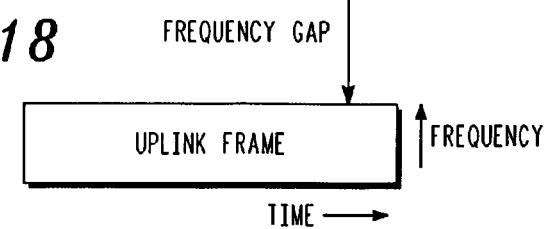

FIG. 18 shows that a plurality of sub-channel bandwidths can be used in a system in order to support different types of narrowband remote units with different bandwidth capabilities. For instance, a system with a total bandwidth of 20 MHz could simultaneously serve wideband 20 MHz remote units, a first type of narrowband units having a bandwidth of 10 MHz, a second type of narrowband units having a bandwidth of 5 MHz, and a third type of narrowband units having a bandwidth of 1.25 MHz.

While the invention has been particularly shown and described with reference to a particular embodiment, it will be understood by those skilled in the art that various changes in form and details may be made therein without departing from the spirit and scope of the invention. For example, the above description was given with respect to an OFDM communication system having many subcarriers; however, one of ordinary sill in the art will recognize that the present invention may be applicable to wideband systems having no subcarriers. In this case, the continuous wideband frequency range is utilized for wideband transmission, while only a portion of the frequency band is utilized for narrowband transmissions. The best frequency range for communication will be chosen by the narrowband unit, and reported back to the base station via a channel-quality report message. Narrowband communication will then take place over the reported best frequency range. Additionally, while the above-description was given with respect to downlink transmission, it will be understood by those skilled in the art that the above description is applicable to uplink transmissions as well. It is intended that such changes come within the scope of the following claims.

The invention claimed is:

1. A method for a narrowband mobile unit to receive data in a wideband communication system, the method comprising the steps of:
   scanning within a wideband channel;
   evaluating channel quality for various sub-channels within the wideband channel;
   sending a channel-quality report to a base station, wherein the channel-quality report is based on the channel quality for the various sub-channels within the wideband channel;
   receiving a channel assignment from the base station for narrowband data reception within the wideband channel; and
   receiving data over a narrowband channel within the wideband channel based on the channel assignment wherein a modulation and coding scheme for the data is based predominantly on the channel quality report.

2. The method of claim 1 wherein the step of scanning the wideband channel comprises the step of scanning sub-channels that make up the wideband channel.

3. The method of claim 1 wherein the step of evaluating the channel quality for various sub-channels within the wideband channel comprises the step of evaluating channel quality taken from the group consisting of a received signal strength indicator (RSSI), a received carrier over noise ratio, and a received carrier over interference, a received carrier over noise plus interference.

4. The method of claim 1 wherein the step of sending the channel-quality report comprises the step of sending a list of preferred sub-channels or a list of sub-channels to avoid.

5. The method of claim 1 wherein the step of sending the channel-quality report comprises the step of sending quality information for the scanned wideband channel.

6. The method of claim 1 wherein the step of evaluating channel quality for various sub-channels comprises the step of evaluating the channel quality for various sub-channels on a frame-by-frame basis.

7. The method of claim 1 wherein the step of receiving the data comprises the step of receiving the data having a modulation and coding rate based on the frequency-selective channel characteristics, and wherein the modulation and coding rate changes on a frame-by-frame basis.

8. A method comprising the steps of:
   receiving a channel-quality report from a narrowband remote unit, wherein the channel quality report is based on channel quality for various sub-channels within a wideband channel;
   determining a portion of a wideband channel to utilize for narrowband transmissions based on the channel-quality report;
   determining a modulation and coding scheme for the narrowband transmissions based on the channel-quality report;
   transmitting a channel assignment to the narrowband remote unit assigning the narrowband remote unit the portion of the wideband channel; and transmitting data using the modulation and coding scheme to the narrowband remote unit over a narrowband channel comprising the portion of the wideband channel.

9. The method of claim 8 further comprising the step of: multiplexing data to a plurality of narrowband remote units over the narrowband channel.

10. The method of claim 8 further comprising the step of: simultaneously transmitting to a plurality of narrowband remote units over differing narrowband channels.

11. The method of claim 8 further comprising the steps of: multiplexing data to the narrowband remote unit and a wideband remote unit within a same frame; and transmitting to the narrowband remote unit and the wideband remote unit within the same frame.

12. An apparatus comprising:
channel scanning circuitry for scanning a wideband channel;
logic circuitry for evaluating channel quality for various sub-channels within the wideband channel;
a transmitter for sending a channel-quality report to a base station, wherein the channel-quality report is based on the channel quality for various sub-channels within the wideband channel; and
a receiver receiving a channel assignment from the base station and receiving data over a portion of the wideband channel based on the channel-quality report, wherein a modulation and coding scheme for the data is based predominantly on the channel quality for various sub-channels within the wideband channel.

13. The apparatus of claim 12 wherein the channel scanning circuitry scans subcarriers making up the wideband channel.

14. The apparatus of claim 12 wherein the channel quality is taken from the group consisting of a received signal strength indicator (RSSI), a received carrier over noise ratio, and a received carrier over interference, a received carrier over noise plus interference.

15. An apparatus comprising:
receiving circuitry receiving a channel-quality report from a narrowband remote unit, wherein the channel quality report is based on channel quality for various sub-channels within a wideband channel;
logic circuitry for determining a portion of a wideband channel to utilize for narrowband transmissions based on the channel-quality report, the logic circuitry additionally determining a modulation and coding scheme for the narrowband transmissions based on the channel-quality report;
modulation and coding circuitry for modulating and coding the data to be transmitted to the narrowband remote unit; and
transmitting circuitry for transmitting data to the narrowband remote unit over the portion of the wideband channel, the data having a modulation and coding scheme based on the channel-quality report.

16. The method of claim 1 wherein the channel assignment and the data are received on differing narrowband channels within the wideband channel.

17. The method of claim 1 wherein the step of receiving the channel assignment comprises the step of receiving a first part of the channel assignment on a first portion of the wideband channel and a second part of the channel assignment on a second portion of the wideband channel wherein receiving the first part and receiving the second part are non-overlapping in time.

18. The method of claim 1 wherein the step of receiving the channel assignment comprises receiving the channel assignment on a well-known subchannel within the wideband channel that is known to be used for communicating narrowband channel assignments.

19. The method of claim 1 wherein the step of receiving the channel assignment comprises receiving the channel assignment on a subchannel preferred by the narrowband mobile unit based on the channel quality for the various sub-channels within the wideband channel.

20. The method of claim 8 wherein the step of receiving a channel-quality report from the narrowband remote unit comprises receiving a plurality of channel-quality reports, each channel quality report from a different narrowband remote unit of a plurality of remote units, and wherein the step of determining a portion of a wideband channel to utilize for narrowband transmissions based on the channel-quality report comprises selecting at least a particular remote unit from the plurality of remote units based on the channel-quality reports and a subchannel arbitration scheme; and wherein the channel assignment and data are for the at least particular remote unit.

* * * * *